United States Patent
Tanaka et al.

(10) Patent No.: US 8,879,165 B2
(45) Date of Patent: Nov. 4, 2014

(54) DEVICE FOR CHANGING OPERATING FORCE OF LENS DEVICE

(71) Applicant: FUJIFILM Corporation, Tokyo (JP)

(72) Inventors: Minoru Tanaka, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/287,398

(22) Filed: May 27, 2014

(65) Prior Publication Data

US 2014/0268375 A1 Sep. 18, 2014

Related U.S. Application Data

(63) Continuation of application No. PCT/JP2012/078932, filed on Nov. 8, 2012.

(30) Foreign Application Priority Data

Nov. 28, 2011 (JP) .................................. 2011-259331

(51) Int. Cl.
G02B 7/00 (2006.01)
G02B 7/02 (2006.01)

(52) U.S. Cl.
CPC ...................................... G02B 7/026 (2013.01)
USPC ....................................................... 359/694

(58) Field of Classification Search
USPC .......... 359/694, 696, 702, 704, 822–826, 830
See application file for complete search history.

(56) References Cited

U.S. PATENT DOCUMENTS

| | | | |
|---|---|---|---|
| 5,940,633 A * | 8/1999 | Yamamoto et al. | 396/85 |
| 6,456,796 B1 | 9/2002 | Tanaka et al. | |
| 2002/0025168 A1 | 2/2002 | Sugita et al. | |
| 2008/0240709 A1 | 10/2008 | Nakamura | |

FOREIGN PATENT DOCUMENTS

| | | |
|---|---|---|
| JP | 10-170795 | 6/1998 |
| JP | 10-311939 | 11/1998 |
| JP | 2000-258678 | 9/2000 |
| JP | 2002-062569 | 2/2002 |
| JP | 2002-107606 | 4/2002 |

(Continued)

OTHER PUBLICATIONS

International Search Report PCT/JP2012/078932 dated Feb. 12, 2013.

(Continued)

*Primary Examiner* — Joseph P Martinez
(74) *Attorney, Agent, or Firm* — Young & Thompson

(57) ABSTRACT

An outer tube body of a device for changing operating force is connected to a gear part of a zoom ring of a lens barrel to rotate the outer tube body together with the zoom ring. The outer tube body has a cylindrical shape and includes a hollow part into which an inner tube body whose rotation is restricted is arranged. Grease is interposed in a gap is formed between an inner peripheral surface of the outer tube body and an outer peripheral surface of the inner tube body. A load caused by viscosity resistance of the grease is applied against rotation of the outer tube body together with the zoom ring. The inner tube body can be displaced in a direction of the center axis so that area of a sliding contact region between the outer tube body and the inner tube body is changed.

16 Claims, 7 Drawing Sheets

(56) References Cited

FOREIGN PATENT DOCUMENTS

| | | |
|---|---|---|
| JP | 2005-084194 | 3/2005 |
| JP | 2008-278463 | 11/2008 |
| JP | 2010-160511 | 7/2010 |

OTHER PUBLICATIONS

International Preliminary Report on Patentability (Chapter II of the Patent Cooperation Treaty) PCT/JP2012/078932 dated Jan. 24, 2014, with English translation.

* cited by examiner

DEVICE FOR CHANGING OPERATING FORCE OF LENS DEVICE

CROSS-REFERENCE TO RELATED APPLICATIONS

This application is a continuation application and claims the priority benefit under 35 U.S.C. §120 of PCT Application No. PCT/JP2012/078932 filed on Nov. 8, 2012 which application designates the U.S., and also claims the priority benefit under 35 U.S.C. §119 of Japanese Patent Application No. 2011-259331 filed on Nov. 28, 2011, which applications are all hereby incorporated by reference in their entireties.

BACKGROUND OF THE INVENTION

1. Field of the Invention

The present invention relates to a device for changing operating force of a lens device, and in particular, to a device for changing operating force of a lens device capable of changing (adjusting) operating force (operating torque) for rotating an operating ring of an imaging lens used in a television camera and the like for broadcasting or business use.

2. Description of the Related Art

In a lens device used in a television camera for broadcasting or business use, there has been a well-known device including a rotatable operating ring provided around an outer periphery of a lens barrel, the device being capable of performing optical adjustment of an imaging optical system arranged in the lens barrel by manually or electrically rotating the operating ring. In a lens device called an ENG lens for a hand-held camera (an ENG camera) that is carried mainly in news gathering, and so on, for example, a focus ring for focus adjustment, a zoom ring for zoom adjustment, and an iris ring for diaphragm adjustment, are generally provided as the operating ring.

In a case where the operating ring above is manually rotated to perform optical adjustment, operating force (operating torque) required to rotate the operating ring affects an operational feeling of an operator, so that preferable operating torque to be felt differs depending on an operator. Thus, a mechanism of changing operating force, capable of adjusting operating torque of an operating ring, has been conventionally suggested as described in Japanese Patent Application Laid-Open Nos. 10-311939, 2005-84194 and 2000-258678, for example.

In Japanese Patent Application Laid-Open No. 10-311939, a thin plate member is arranged so as to be brought into sliding contact with an inner peripheral surface of an operating ring of a lens barrel. The thin plate member includes a mechanism of changing area of a region in which the thin plate member is in sliding contact with the inner peripheral surface of the operating ring by moving the thin plate member in an axial direction of the lens barrel with using a load adjustment knob. In addition, there is viscous fluid such as grease between the inner peripheral surface of the operating ring and the thin plate member. As a result, viscosity resistance of the viscous fluid applies a load against rotation of the operating ring to achieve an effect, such as that operating torque is reduced at a time of rotating at a constant low speed, and is increased at a time of rotating at a high speed. The mechanism of changing adjusts area of a region in which the thin plate member is in sliding contact with the inner peripheral surface of the operating ring so as to apply a load corresponding to area of a sliding contact region to the operating ring, thereby enabling a value of the operating torque to be adjusted.

In Japanese Patent Application Laid-Open Nos. 2005-84194 and 2000-258678, there is arranged a friction plate to be pressed a gear connected to a gear part of an operating ring. The friction plate includes a mechanism for changing pressing force to the gear. Accordingly, frictional force between the gear and the friction plate applies a load against rotation of the gear so that the load against rotation of the gear is applied as a load against rotation of the operating ring. An adjustment mechanism adjusts the pressing force of the friction plate to the gear to adjust a value of the frictional force (frictional resistance) between the friction plate and the gear, thereby enabling a value of operating torque of the operating ring to be adjusted.

An operating force adjustment device, such as shown in Japanese Patent Application Laid-Open No. 2002-107606, is suggested as a device of adjusting operating force in a lens operation by using viscosity resistance of viscous fluid. In Japanese Patent Application Laid-Open No. 2002-107606, the operating force adjustment device is connected to a cam barrel that drives a lens so as to adjust operating force required to rotate the cam barrel. The operating force adjustment device includes a casing for storing viscous fluid, and a rotary shaft supported by the casing, rotating in the viscous fluid, in which the rotary shaft includes a part extending to the outside of the casing external so that the part is connected to the cam barrel to rotate the rotary shaft together with rotation of the cam barrel. A rotary plate to be rotated in the viscous fluid is attached to a part of the rotary shaft in the casing, the rotary plate being rotated together with the rotary shaft, so as to apply viscosity resistance of the viscous fluid to the rotary shaft via the rotary plate. In addition, it is configured to apply desired voltage to the viscous fluid so that viscosity of the viscous fluid is adjustable by a voltage value of applied voltage. Accordingly, viscosity resistance of the viscous fluid against rotation of the rotary shaft of the operating force adjustment device is applied as a load against rotation of the cam barrel, serving as a load against an operation of rotating the cam barrel. Adjustment to viscosity of the viscous fluid by changing a value of voltage applied to the viscous fluid allows operating force for rotating the cam barrel to be adjustable.

SUMMARY OF THE INVENTION

There are quite much users who feel that applying a load caused by viscosity resistance of viscous fluid to an operating ring as shown in Japanese Patent Application Laid-Open No. 10-311939 is preferable rather than applying a load caused by frictional resistance to an operating ring as shown in Japanese Patent Application Laid-Open Nos. 2005-84194 and 2000-258678, as an operational feeling when operating an operating ring.

Unfortunately, in a mechanism of adjusting operating torque by changing area of a region, in which a thin plate member is in sliding contact with an inner peripheral surface of an operating ring, by moving a thin plate member arranged on an inner peripheral surface side of the operating ring in the axial direction of a lens barrel, as shown in Japanese Patent Application Laid-Open No. 10-311939, there is a problem of a space allowing the thin plate member to be arranged in a movable manner, that is, a lens barrel is typically downsized to eliminate an excess space as much as possible, therefore, it is difficult to secure a sufficient space for arranging the thin plate member in a movable manner without increasing the size of the lens barrel. As a result, it is impossible to sufficiently change area of a sliding contact region between the inner peripheral surface of the operating ring and the thin plate member, therefore, there is a problem in which a changing amount (adjustment amount) of operating torque is small. On the contrary, in order to increase an adjustment amount of operating torque, a space for allowing area (a width in a fore-and-aft direction) of the inner peripheral surface of the operating ring to be increased as well as a space for arranging the thin plate member in a movable manner are required, therefore, there is a problem of causing the size of the lens barrel to be increased.

On the other hand, if it is configured to provide a mechanism of adjusting operating force in a lens barrel as shown in Japanese Patent Application Laid-Open No. 2002-107606, it is possible to solve the problem of a space, however, in a case where viscous fluid is stored in a casing as shown in Japanese Patent Application Laid-Open No. 2002-107606, there is a problem in which a structure of sealing a gap between a rotary shaft and the casing is required to prevent the viscous fluid from leaking outside from the gap, thereby causing cost increase.

The present invention is made in light of the above-mentioned circumstances, and an object of the present invention is to provide a device for changing operating force of a lens device, capable of: applying a load caused by viscosity resistance against rotation of an operating ring so as to obtain an excellent operational feeling; changing operating force for rotating the operating ring without adding change to an existing lens barrel by using an inexpensive device; and increasing a change amount of the operating force.

In order to achieve the object, the device for changing operating force of a lens device, in accordance with the present invention, includes: an operating ring rotatably provided around an outer periphery of a lens barrel; a rotating body connected to the operating ring to rotate around a rotary shaft in a predetermined direction together with rotation of the operating ring, the rotating body having a cylindrical peripheral surface centering on the rotary shaft; a non-rotating body whose rotation is restricted, the non-rotating body having a cylindrical peripheral surface arranged in a position facing the peripheral surface of the rotating body with a gap; viscous fluid having viscosity interposed in the gap, the viscous fluid applying a load caused by viscosity resistance thereof against rotation of the rotating body rotating together with the operating ring to produce operating force required to rotate the operating ring by the load; an operation member for changing operating force to be operated by an operator to change the operating force; and non-rotating body driving means for changing a value of a load against rotation of the rotating body by moving the non-rotating body in a direction of the rotary shaft corresponding to an operation of the operation member for changing operating force by an operator to change a size of an area of a sliding contact region in which the peripheral surface of the rotating body and the peripheral surface of the non-rotating body face each other.

The present invention enables a load caused by viscosity resistance against rotation of an operating ring to be applied so that an excellent operational feeling can be obtained with respect to a rotating operation of the operating ring. Since the device for changing operating force of the present invention is allowed to be installed outside a lens barrel, there is no severe restriction on a movement amount of a non-rotating body. Accordingly, it is possible to greatly change area of a sliding contact region between a rotating body and a non-rotating body, therefore, a changing amount of the operating force can be increased.

In the present invention, the rotating body is formed into a cylindrical shape having a hollow part to have an inner peripheral surface serving as a peripheral surface of the rotating body, and it is preferable to insert and arrange the non-rotating body in the hollow part of the rotating body.

In the present invention, it is preferable to provide lock means for disabling an operation of the operation member for changing operating force.

In the present invention, it is preferable to provide automatic changing means for automatically changing a position of the non-rotating body with respect to a direction of the rotary shaft by using the non-rotating body drive means in accordance with a type or an individual of a camera body to which the lens barrel is attached, thereby changing a value of the operating force.

In the present invention, it is also possible to allow the rotating body to serve as a component for connecting a motor for electrically rotating the operating ring and the operating ring in a power transmission mechanism.

The present invention is capable of: applying a load caused by viscosity resistance against rotation of an operating ring so as to obtain an excellent operational feeling; changing operating force for rotating the operating ring without adding change to an existing lens barrel by using an inexpensive device; and increasing a change amount of the operating force.

DETAILED DESCRIPTION OF THE PREFERRED EMBODIMENTS

Hereinafter, referring to accompanying drawings, preferable embodiments of the device for changing operating force of a lens device, in accordance with the present invention, will be described in detail.

Figure 1:
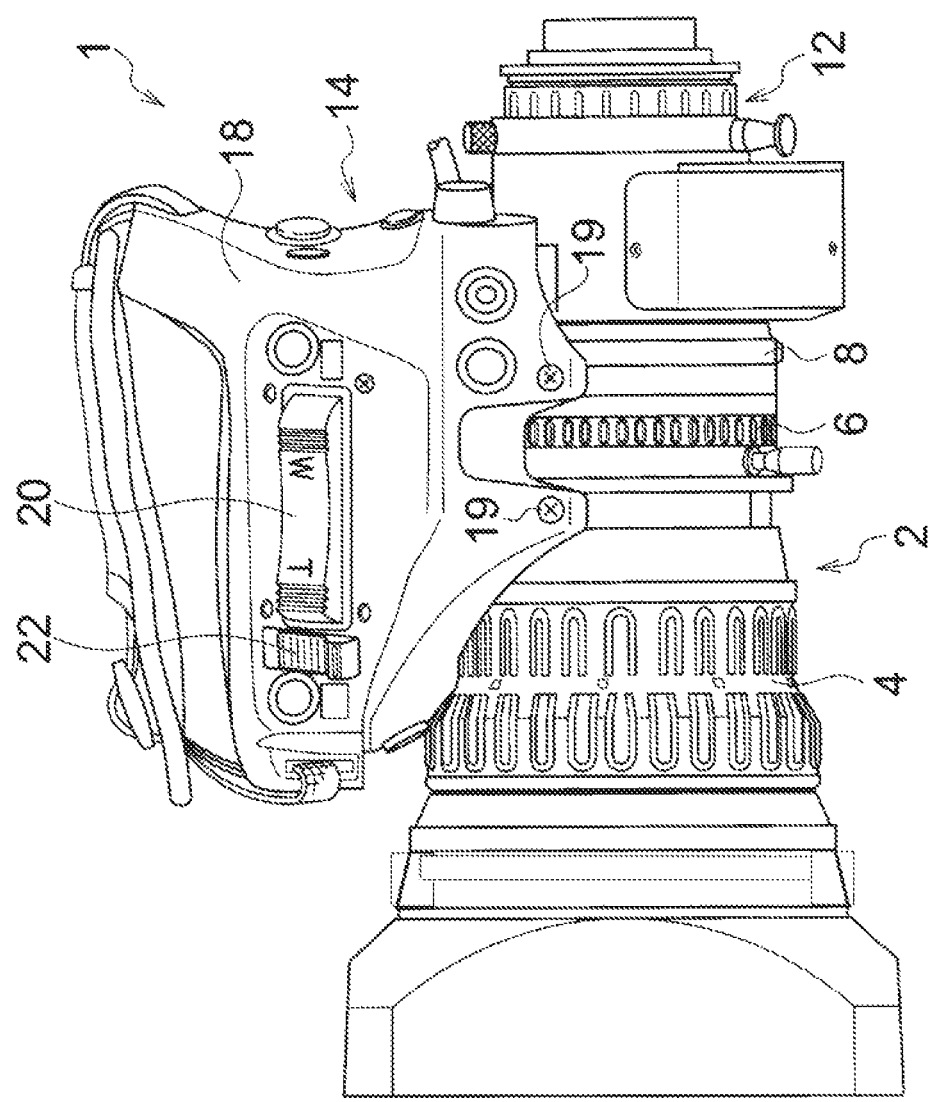
FIG. 1 is a plan view showing an appearance of an ENG lens to which the present invention is applied.

FIG. 1 is an external view showing an example of a lens device (ENG lens) for a television camera, to which the invention of the present application is applied. An ENG lens 1 shown in FIG. 1 is an inner focus type zoom lens used in a television camera for broadcasting or business use such as an ENG camera, and includes a lens barrel 2 provided with a focus ring 4, a zoom ring 6 and an iris ring 8. The lens barrel 2 is provided its rear end with a mounting part 12 to be detachably mounted on a lens mount of a camera body (camera head) including an imaging element and the like, which is not shown.

Though detailed description of the internal configuration of the lens barrel 2 is omitted, as is well-known, an imaging optical system supported in the lens barrel 2 includes a fixed focus lens group, a mobile focus lens (simply referred to as a focus lens group), a variable power lens group (zoom lens group), a diaphragm (diaphragm device), and a relay lens group, and the like, in order from a front side (subject side). Rotating the focus ring 4 allows the focus lens group to be moved back and forth along an optical axis so that a focus (focus position) of the imaging optical system is moved to a proximate side or an infinite side. In addition, rotating zoom ring 6 allows the zoom lens group to be moved back and forth along the optical axis so that a zoom (focal length) of the imaging optical system is moved to a wide side or a telephoto side, and rotating the iris ring 8 allows an opening diameter of a diaphragm to be changed so that a diaphragm value of the imaging optical system is increased or reduced.

A drive unit 14 for driving the focus ring 4, the zoom ring 6, and the iris ring 8, by using a motor is attached to a side of the lens barrel 2.

The drive unit 14 has a case 18 that is attached to the side of the lens barrel 2 with screws 19.

In the case 18, motors for focus drive, zoom drive, and iris drive, which are not shown, are arranged. The motor for focus drive is connected to the focus ring 4 via a gear transmission mechanism, which is not shown, so that the focus ring 4 is rotated by power produced by the motor for focus drive. Some drive units 14 do not include a motor for focus drive.

The motor for zoom drive is connected to the zoom ring 6 via the gear transmission mechanism, which is not shown, so that the zoom ring 6 is rotated by power produced by the motor for zoom drive. Likewise, the motor for iris drive is connected to the iris ring 8 via the gear transmission mechanism, which is not shown, so that the iris ring 8 is rotated by power produced by the motor for iris drive.

A top face of the case 18 is provided with a zoom seesaw control switch 20 (hereinafter referred to as a seesaw switch 20). The seesaw switch 20 serving as an operation member for zooming and electric rotating is provided so as to automatically return to a predetermined neutral position in a nonoperational state, and oscillate (rotate) between a positive side and a negative side at a position of performing a pressing operation. Oscillation directions of the positive and negative sides of the seesaw switch 20 correspond to operation directions of allowing the zoom lens group to be moved to the telephoto side and to the wide side, respectively. If the pressing operation is performed so that the operation direction of the seesaw switch 20 turns to the telephoto side, for example, the motor for zoom drive allows the zoom ring 6 to rotate to the telephoto side, whereby the zoom lens group is moved to the telephoto side. It is possible to adjust a movement speed of the zoom lens group by changing a pressing amount (operating amount) of the seesaw switch 20 at the time so that as the operating amount is increased, the zoom lens group is moved at a higher speed.

The drive unit 14 is allowed to be connected to a controller (zoom demand) provided with an electric operation member for zooming and a controller (focus demand) provided with an electric operation member for focusing with a cable. In a case where these controllers are connected, operation signals based on operations of the operation members for electric rotating of the controllers are supplied to the drive unit 14 so that the motor for zoom drive and the motor for focus drive are driven in response to the operation signals. Thus, in a case where the drive unit 14 is connected to the zoom demand, operating an electric operation member of the zoom demand allows the zoom ring 6 to rotate by using the motor for zoom drive to move the zoom lens group. In a case where the drive unit 14 is connected to the focus demand, operating an electric operation member of the focus demand allows the focus ring 4 to rotate by using the motor for focus drive to move the focus lens group. The drive unit 14 typically has no electric operation member for focusing, therefore, if focus adjustment is electrically performed, the focus demand is connected to the drive unit 14 to operate the electric operation member thereof.

In addition, a camera body, on which the lens barrel 2 is to be mounted, is connected to the drive unit 14 with a cable so that a control signal for diaphragm adjustment is supplied to the drive unit 14 from the camera body, therefore, the motor for iris drive drives in response to the control signal to rotate the iris ring 8, whereby the diaphragm is operated.

Meanwhile, it is possible for an operator to directly and manually perform a rotating operation of the focus ring 4, the zoom ring 6, and the iris ring 8. Accordingly, under a state in which it is assumed that a manual rotating operation will be applied to the focus ring 4 and the zoom ring 6, each of a connection between the focus ring 4 and the motor for focus drive, and a connection between the zoom ring 6 and the motor for zoom drive is automatically disconnected to allow for the manual rotating operation without a load of the motor, that is, it is configured that connection and disconnection of the focus ring 4 and the motor for focus drive, and the zoom ring 6 and the motor for zoom drive, are automatically switched individually. Accordingly, the focus ring 4 is connected to the motor for focus drive in a case where the focus demand above is connected to the drive unit 14, because it is assumed that a remote operation will be performed, and in a case where the focus demand is not connected to the drive unit 14, the focus ring 4 is disconnected to the motor for focus drive. The zoom ring 6 is connected to the motor for zoom drive in a case where the zoom demand above is connected to the drive unit 14, because it is assumed that a remote operation will be performed. In addition, even if the zoom demand is not connected to the drive unit 14, the zoom ring 6 is connected to the motor for zoom drive while the seesaw switch 20 is operated. On the other hand, in a state in which the zoom demand is not connected to the drive unit 14, the zoom ring 6 is disconnected to the motor for zoom drive while the seesaw switch 20 is not operated.

The iris ring 8 is configured so that connection and disconnection to the motor for iris drive is switched by an automatic/manual mode shift switch 22 for a diaphragm, provided on a top face of the drive unit 14. The iris ring 8 is connected to the motor for iris drive in a state in which the automatic/manual mode shift switch 22 is set in the automatic mode, therefore, the iris ring 8 is rotated by the motor for iris drive in response to a control signal from the camera body. The iris ring 8 is disconnected to the motor for iris drive in a state in which the automatic/manual mode shift switch 22 is set in the manual mode to allow for the manual rotating operation of the iris ring 8 without a load of the motor.

Figure 2:
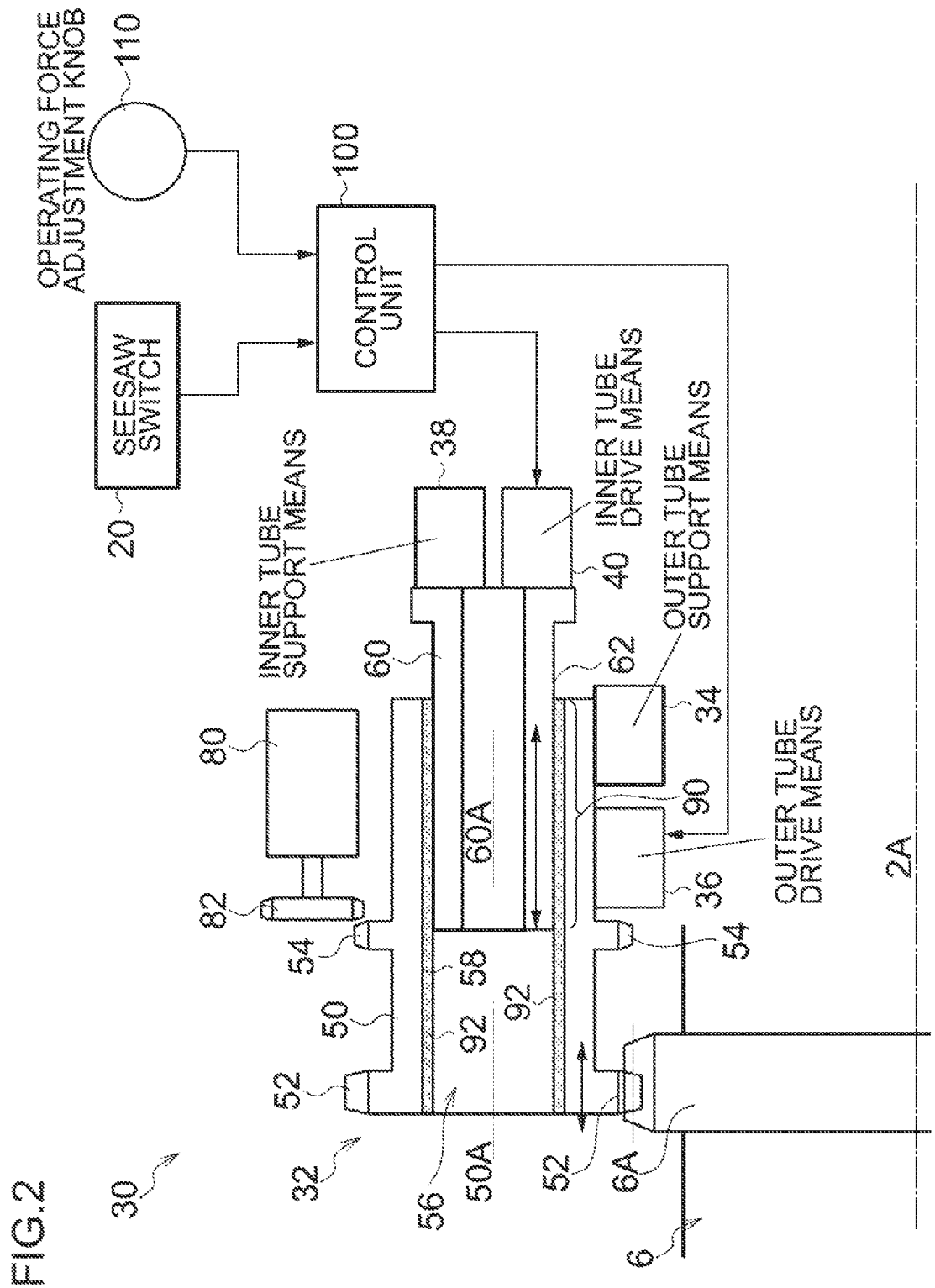
FIG. 2 is a block diagram showing a configuration in which a device for changing operating force, to which the present invention is applied, is incorporated in a drive unit of the ENG lens of FIG. 1.

FIG. 2 is a block diagram showing a configuration in which a device for changing operating force, to which the present invention is applied, is incorporated in the drive unit 14 of the ENG lens 1 of FIG. 1, FIG. 2 illustrating a device for changing operating force that is provided for the zoom ring 6 among the focus ring 4, the zoom ring 6, and the iris ring 8.

As shown in FIG. 2, a device for changing operating force 30 includes a load generation unit 32, outer tube support means 34, outer tube drive means 36, inner tube support means 38, and inner tube drive means 40.

The load generation unit 32, as discussed later, serves as a component of generating a load causing operating force (operating torque) required for a manual rotating operation of the zoom ring 6, and includes an outer tube body 50, and an inner tube body 60.

The outer tube body 50 is formed into a cylindrical shape, and is arranged at a side of the zoom ring 6 so that a center axis 50A thereof is parallel to an axis 2A (optical axis 2A) of the lens barrel 2. The outer tube body 50 is provided around its front end outer periphery with a gear part 52 to be engaged with a gear part 6A of the zoom ring 6 so as to be rotated around the center axis 50A together with rotation of the zoom ring 6.

The outer tube body 50 is provided at its outer periphery around the center with a gear part 54 to be engaged with a gear 82 attached to a shaft of the motor for zoom drive 80. Although FIG. 2 shows a state in which the gear is not engaged, an engaged state will be described later.

The inner tube body 60 is formed into a cylindrical shape so that a diameter of a cylindrical outer peripheral surface 62 is smaller than a diameter of a cylindrical inner peripheral surface 58 of the outer tube body 50, and is inserted and arranged in a hollow part 56 of the outer tube body 50 so that a center axis 60A thereof substantially corresponds with the center axis 50A of the outer tube body 50. A front side of the inner tube body 60 is inserted from an opening at a rear side of the hollow part 56 in the outer tube body 50 so that the inner tube body 60 is arranged in the hollow part 56 of the outer tube body 50.

It is configured to form a gap between the inner peripheral surface 58 and the outer peripheral surface 62, in a region (sliding contact region 90) in which the inner peripheral surface 58 of the outer tube body 50 and the outer peripheral surface 62 of the inner tube body 60 face each other so that grease 92 is interposed in the gap as viscous fluid. As a result, as discussed later, when the outer tube body 50 is rotated, a load caused by viscosity resistance of the grease 92 is applied against rotation of the outer tube body 50 so as to cause a load against rotation of the zoom ring 6 to occur from the outer tube body 50. The grease 92 adheres to the whole of the inner peripheral surface 58 of the outer tube body 50 or the whole of the outer peripheral surface 62 of the inner tube body 60, or both the surfaces. FIG. 2 shows a state in which the grease adheres to the inner peripheral surface 58 of the outer tube body 50.

The outer tube support means 34 is shown having a mechanism in which the outer tube body 50 is supported in a rotatable manner with respect to a barrel body of the lens barrel 2 or the case 18 of the drive unit 14 as well as in a movable manner in a fore-and-aft direction thereof.

Figure 5:
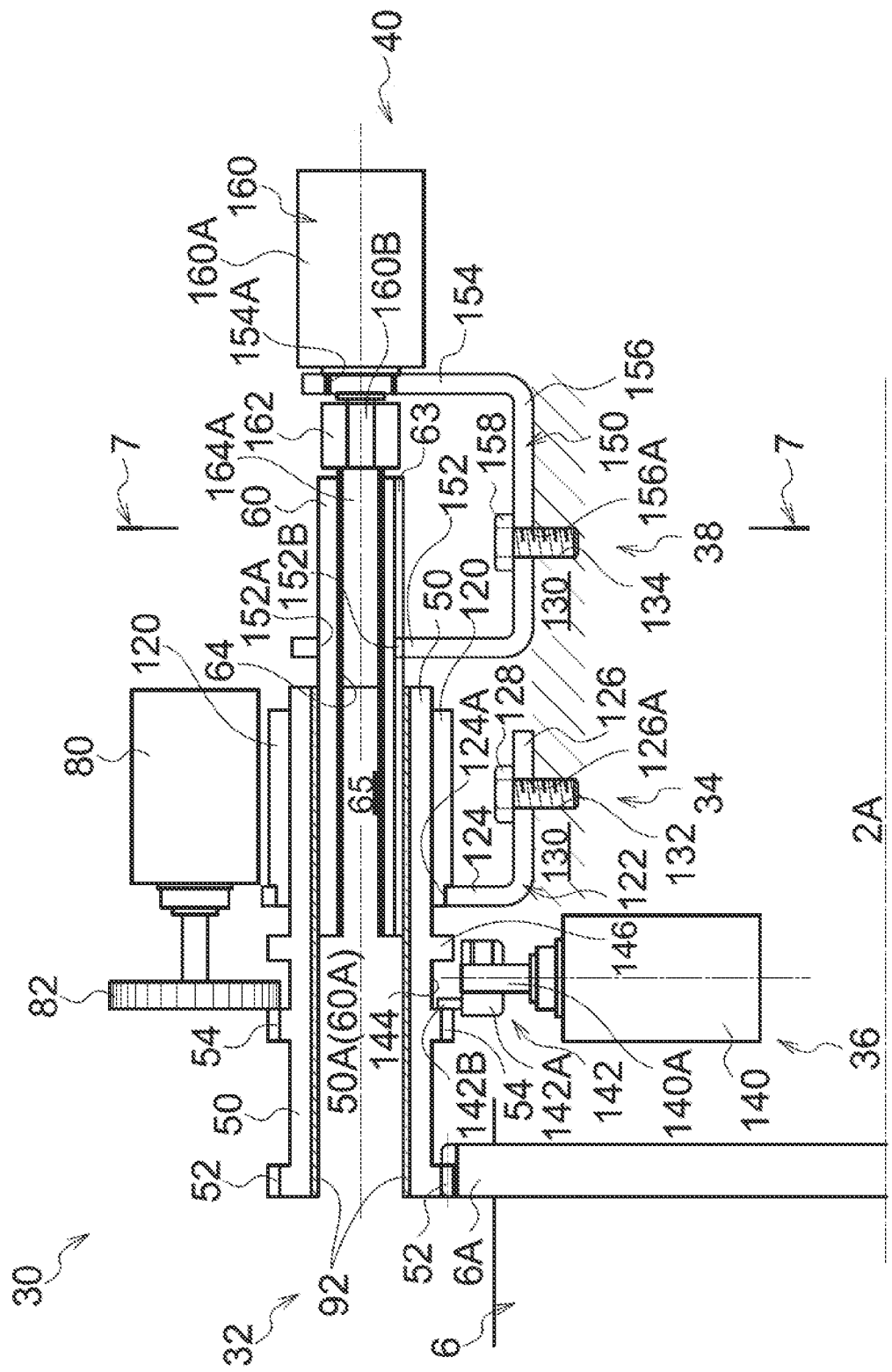
FIG. 5 is a configuration diagram showing an example a configuration of a device for changing operating force.

FIG. 5 is a configuration diagram of a device for changing operating force showing an example of a configuration of the outer tube support means 34, the outer tube drive means 36, the inner tube support means 38, and the inner tube drive means 40, in the device for changing operating force of FIG. 2.

The outer tube support means 34 is composed of a cylindrical member 120 and a fixing member 122, as shown in FIG. 5, for example.

The cylindrical member 120 is formed into a cylindrical shape having a hollow part penetrating in an axial direction thereof. The outer tube body 50 is inserted in the hollow part to be supported in the cylindrical member 120 so as to be movable in a direction of the center axis 50A and rotatable around the center axis 50A in a state in which an inner peripheral surface of the cylindrical member 120 and an outer peripheral surface of the outer tube body 50 are in contact with each other.

The fixing member 122 is formed by bending a plate-shaped body at a substantially right angle, and includes an erected portion 124 arranged along a direction substantially orthogonal to the axis 2A (optical axis 2A) of the lens barrel 2, and a screw-on portion 126 arranged along a direction substantially parallel to the axis 2A of the lens barrel 2. The erected portion 124 is provided with a circular opening 124A penetrating therethrough, and a front end of the cylindrical member 120 is fitted and fixed in the opening 124A.

The screw-on portion 126 includes two screw insertion holes 126A, for example, through which a screw 128 is to be inserted. The screw 128 inserted into the screw insertion hole 126A is screwed into a screw hole 132 of an attachment part 130, such as an attachment frame, fixed to the barrel body (fixed tube) of the lens barrel 2, the case 18 of the drive unit 14, or any part of them, so that the screw-on portion 126 is fixed to the attachment part 130.

In the outer tube support means 34 configured as above, the cylindrical member 120 is fixed to the attachment part 130 via the fixing member 122 so that an axis thereof is substantially parallel to the axis 2A of the lens barrel 2. The outer tube body 50 supported by the cylindrical member 120 is supported in a rotatable manner with respect to the barrel body of the lens barrel 2 or the case 18 of the drive unit 14 as well as in a movable manner in a fore-and-aft direction thereof.

When the outer tube body 50 is rotated, frictional force occurs between the inner peripheral surface of the cylindrical member 120 and the outer peripheral surface of the outer tube body 50 to apply a load against rotation of the outer tube body 50, thereby causing a load against rotation of the zoom ring 6 to occur. However, the load is lower as compared with a load caused by viscosity resistance of the grease 92 interposed between the outer tube body 50 and the inner tube body 60 so as not to much affect operating force and operational feeling against rotation of the zoom ring 6.

Unlike the outer tube support means 36 of FIG. 5, in which the outer tube is supported by bringing the outer peripheral surface of the outer tube body 50 into contact with the inner peripheral surface of the cylindrical member 120, a bearing (radial bearing) for supporting the outer tube body 50 in a rotatable manner around the center axis 50A thereof and a bearing (linear bearing or slide bearing) for supporting the outer tube body 50 so as to be movable back and forth in a direction of the center axis 50A may be interposed between the outer peripheral surface of the outer tube body 50 and the inner peripheral surface of the cylindrical member 120. For example, a structure of fixing the linear bearing on an inner periphery side of the radial bearing, or a structure reverse to the structure above, can be provided between the inner peripheral surface of the cylindrical member 120 and the outer peripheral surface of the outer tube body 50.

The outer tube drive means 36 serves as a mechanism in which the outer tube body 50 is moved in a fore-and-aft direction thereof. The outer tube drive means 36 is composed of a switching motor 140, an engaging part 142, and a recessed portion 144 of the outer tube body 50, as shown in FIG. 5, for example.

The switching motor 140 is directly or indirectly (indirectly via an attachment frame or the line) supported in the barrel body of the lens barrel 2 or the case 18 of the drive unit 14, and is to be operated by control of a control unit 100 of FIG. 2.

The engaging part 142 includes a fixing member 142A fixed to the outside of a peripheral surface of a rotary shaft 140A of the switching motor 140, the fixing member 142A being provided its end face with a rotatable roller 142B extending in a direction of the rotary shaft 140A. Accordingly, as the rotary shaft 140A of the switching motor 140 is rotated, the roller 142B is rotated around the rotary shaft 140A so as to be moved along a circular orbit of a prescribed radius with respect to the center of the rotary shaft 140A.

The recessed portion 144 of the outer tube body 50 is a portion formed into a recessed shape by the gear part 54 described above formed by extending on an outer periphery of the outer tube body 50 and a protrusion 146 protruding along a circumferential direction provided on a rear side of the gear part. In the recessed portion 144, the roller 142B of the engaging part 142 described above is inserted and arranged.

In the outer tube drive means 36 configured as above, when the roller 142B of the engaging part 142 is moved to a front side in the fore-and-aft direction by rotation of the rotary shaft 140A of the switching motor 140, the roller 142B is brought into contact with a wall surface at a front side of the recessed portion 144, or a side wall surface of the gear part 54, and presses the wall surface to the front side, so that as the roller 142B is moved, the outer tube body 50 is moved to the front side. Moving the roller 142B to a position to be the most front side to stop the roller 142B there allows the gear 82 of the motor for zoom drive 80 to be disengaged from the gear part 54 of the outer tube body 50, at least as shown in FIGS. 2 and 5, therefore, it is possible to set a manual state where a rotating operation of the zoom ring 6 is manually performed. When the outer tube body 50 is rotated by a rotating operation of the zoom ring 6, the roller 142B is rotated while being in contact with the wall surface (the side wall surface of the gear part 54) of the recessed portion 144.

Figure 3:
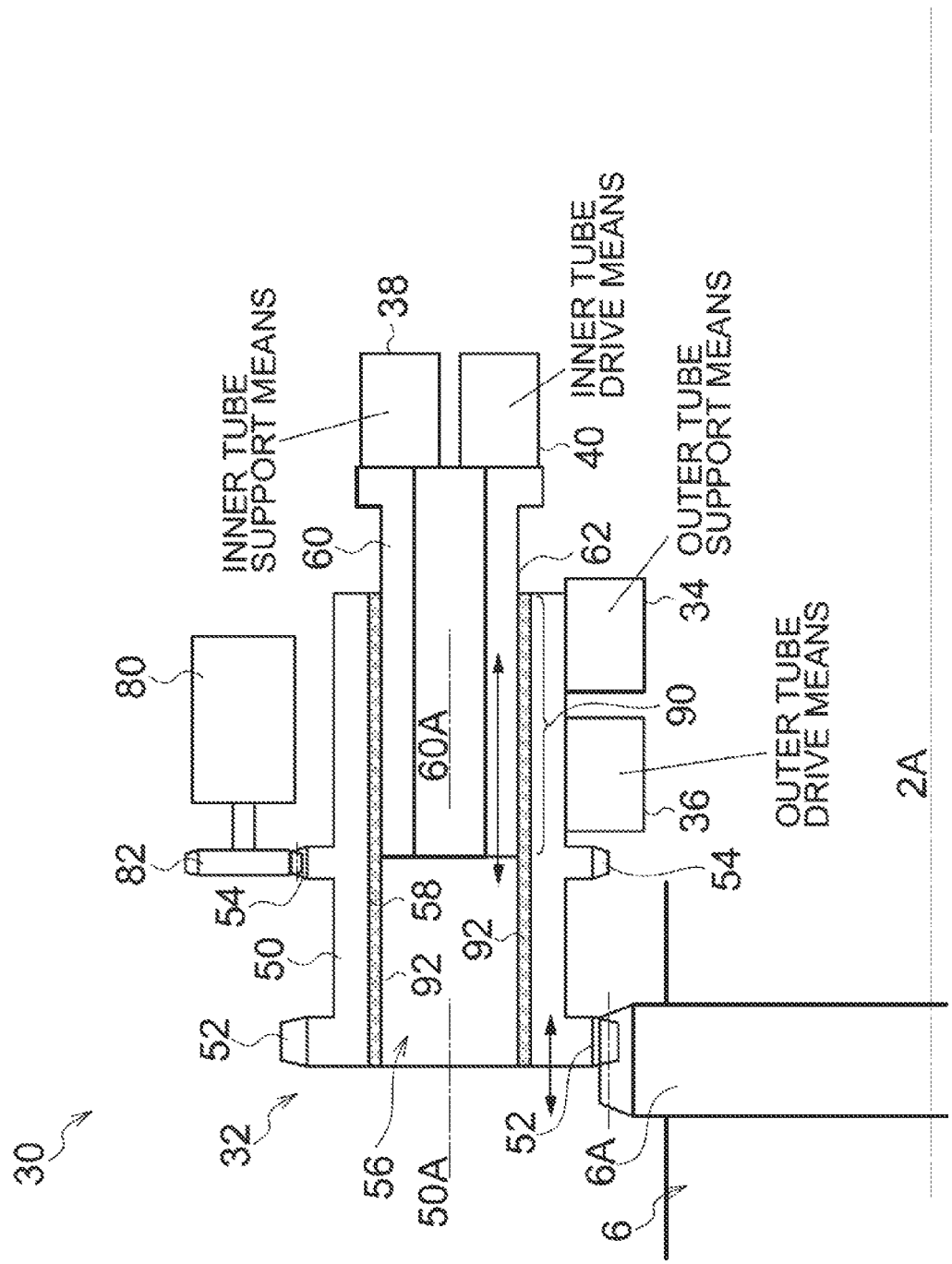
FIG. 3 shows an electric state of rotating an operating ring by using a motor in a device for changing operating force.
Figure 6:
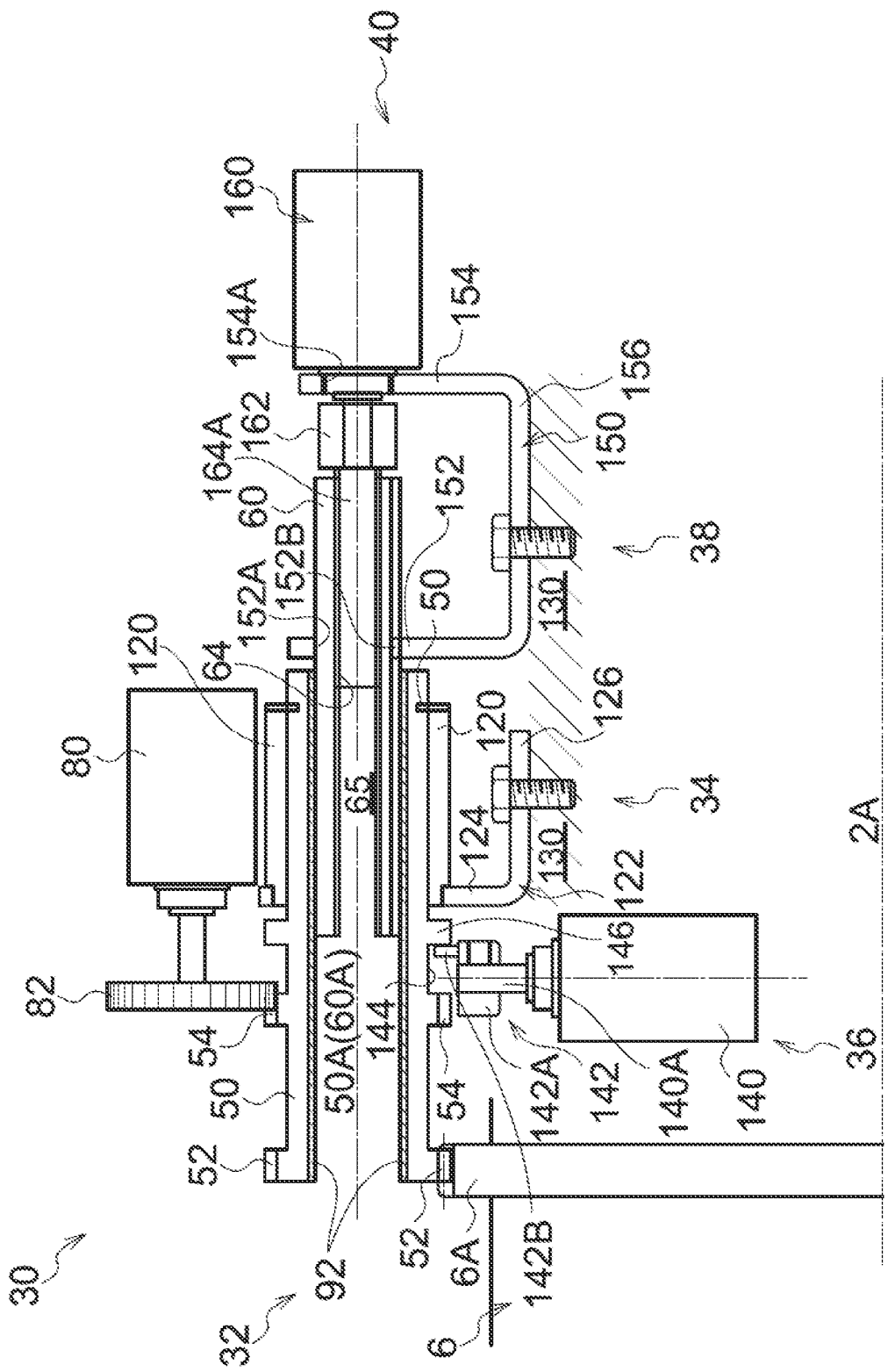
FIG. 6 shows an electric state of rotating an operating ring by using a motor in the device for changing operating force of FIG. 5.

Meanwhile, when the roller 142B is moved to a rear side in the fore-and-aft direction, the roller 142B is brought into contact with a wall surface at a rear side of the recessed portion 144, or a side wall surface of the protrusion 146, and presses the wall surface to the rear side, so that as the roller 142B is moved, the outer tube body 50 is moved to the rear side. Moving the roller 142B to a position to be the most rear side to stop the roller 142B there allows the gear 82 of the motor for zoom drive 80 to be engaged with the gear part 54 of the outer tube body 50, at least as shown in FIGS. 3 and 6, therefore, it is possible to set a electric rotating state where a rotating operation of the zoom ring 6 is performed by electric rotating. When the outer tube body 50 is rotated by the motor for zoom drive 80, the roller 142B is rotated while being in contact with the wall surface (the side wall surface of the protrusion 146) of the recessed portion 144.

As described above, moving the outer tube body 50 in the fore-and-aft direction by using the outer tube drive means 36 allows a rotating operation state to be switched between a state in which the gear 82 of the motor for zoom drive 80 is disengaged from the gear part 54 of the outer tube body 50 (the manual state) as shown in FIG. 2 (FIG. 5) and a state in which the gear 82 of the motor for zoom drive 80 is engaged with the gear part 54 of the outer tube body 50 (the electric rotating state) as shown in FIG. 3 (FIG. 6).

The outer tube body 50 is configured to be moved in the fore-and-aft direction by controlling a motor of the outer tube drive means 36 (a motor corresponding to the switching motor 140 in the structure of FIG. 5) with the control unit 100 built in the drive unit 14. When detecting a state in which the zoom demand is not connected to the drive unit 14, and the seesaw switch 20 is not operated, as described above (in a case where an operation signal from the seesaw switch 20 shows that the seesaw switch 20 is at a neutral position), the control unit 100 sets the outer tube body 50 at the manual state as shown in FIG. 2 (FIG. 5). Accordingly, the zoom ring 6 is allowed to be disconnected to the motor for zoom drive 80 so that a rotating operation of the zoom ring 6 can be manually performed without a load of the motor for zoom drive 80.

Meanwhile, when detecting a state in which the zoom demand is connected to the drive unit 14, or the zoom demand is not connected to the drive unit 14 while the seesaw switch 20 is operated, the control unit 100 sets the outer tube body 50 at the electric rotating state as shown in FIG. 3 (FIG. 6). Accordingly, the zoom ring 6 is allowed to be connected (connection) to the motor for zoom drive 80 via the outer tube body 50, so that the zoom ring 6 can be electrically rotated by power produced by the motor for zoom drive 80. At the time, the control unit 100 allows the motor for zoom drive 80 to be driven so that the zoom ring 6 is rotated in accordance with an operation signal supplied from the zoom demand on the basis of an operation signal from the seesaw switch 20 or an operation of the electric operation member of the zoom demand.

Even if the zoom demand is connected to the drive unit 14, in a state in which both the electric operation member of the zoom demand and the seesaw switch 20 are not operated, the outer tube body 50 may be set at the manual state of FIG. 2 (FIG. 5) so that a rotating operation of the zoom ring 6 is manually performed.

Unlike automatic switching between the manual state of FIG. 2 (FIG. 5) and the electric state of FIG. 3 (FIG. 6) as described above, an operator may select one of the manual operation and the electric operation by using predetermined selection means. In the case, when detecting that the manual operation is selected by the selection means, the control unit 100 may set the outer tube body 50 at the manual state of FIG. 2 (FIG. 5), and when detecting that the electric operation is selected by the selection means, the control unit 100 may set the outer tube body 50 at the electric state of FIG. 3 (FIG. 6). In addition, it is possible that the outer tube drive means 36 does not serve as a mechanism of moving the outer tube body 50 in the fore-and-aft direction by using power of the switching motor 140 as shown in FIGS. 5 and 6, but serves as a mechanism of moving the outer tube body 50 in the fore-and-aft direction by operating force of an operator for the selection means as described above by switching between the manual state of FIG. 2 (FIG. 5) and the electric state of FIG. 3 (FIG. 6).

If an operator manually performs the rotating operation of the zoom ring 6 when the outer tube body 50 is set at the manual state of FIG. 2 (FIG. 5), the outer tube body 50 is rotated around the inner tube body 60 in conjunction with rotation of the zoom ring 6. At the time, a load is applied against rotation of the outer tube body 50 by viscosity resistance of the grease 92 (grease stored in a gap in the sliding contact region 90) interposed between the inner peripheral surface 58 of the outer tube body 50 and the outer peripheral surface 62 of the inner tube body 60 so that the load is applied against rotation of the zoom ring 6 via the outer tube body 50. Thus, the load against rotation of the zoom ring 6 is applied by viscosity resistance in the load generation unit 32 so that operating force (operating torque) required to rotate the zoom ring 6 varies in accordance with a value of the viscosity resistance, whereby an operator feels light when manually performing the rotating operation of the zoom ring 6 at a low speed, and feels heavy when manually performing the rotating operation of the zoom ring 6 at a high speed, to achieve an excellent operational feeling.

In FIG. 2, the inner tube support means 38 serves as a mechanism of supporting the inner tube body 60 with restricting rotation thereof in a movable manner in the fore-and-aft direction.

The inner tube support means 38 includes a fixing member 150 formed by bending a plate-shaped body in a U-shape turned sideways, such as shown in FIG. 5, for example. The fixing member 150 includes a front side erected portion 152 and a rear side erected portion 154, being arranged along a direction substantially orthogonal to the axis 2A (optical axis 2A) of the lens barrel 2, and a screw-on portion 156 arranged along a direction substantially parallel to the axis 2A of the lens barrel 2.

Figure 7:
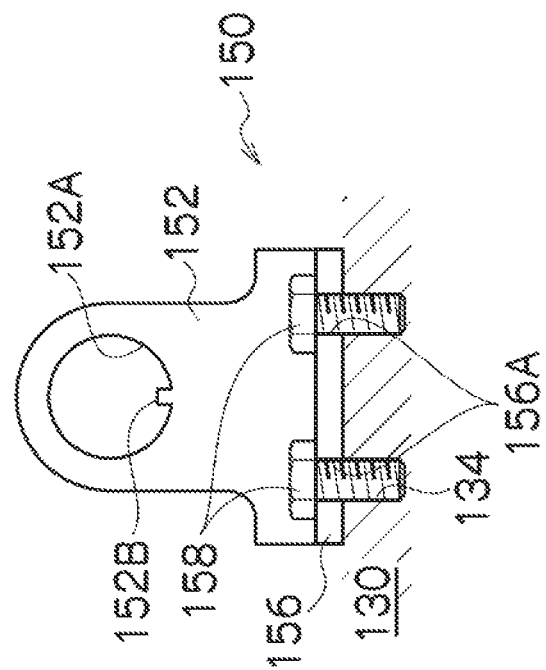
FIG. 7 shows the device in FIG. 5 as viewed from a direction of arrows 7-7.

FIG. 7 is viewed from a direction of arrows 7-7 shown in FIG. 5. As shown in FIG. 7, the front side erected portion 152 of the fixing member 150 is provided with an opening 152A having a shape (substantially circular) substantially corresponding with a section of the inner tube body 60, being penetrated through the front side erected portion 152. The inner tube body 60 is inserted into the opening 152A. In addition, a protrusion 152B is provided at a part of the opening 152A of the front side erected portion 152, and a groove 63 is provided in the outer peripheral surface of the inner tube body 60 along an axial direction thereof. The protrusion 152B in the opening 152A is engaged with the groove 63 in the inner tube body 60 so that the front side erected portion 152 supports the inner tube body 60 with restricting rotation around a center axis 60A in a movable manner in the fore-and-aft direction.

In FIG. 5, the rear side erected portion 154 includes an operation of supporting a motor 160 described later and the like of the inner tube drive means 40 as well as the inner tube body 60 via the motor 160 and the like, and the rear side erected portion 154 is provided with a circular opening 154A in which a body part 160A of the motor 160 of the inner tube drive means 40 is fitted and fixed.

As shown in FIG. 7, the screw-on portion 156 includes two screw insertion holes 156A, for example, through which a screw 158 is to be inserted. The screw 158 inserted into the screw insertion hole 156A is screwed into a screw hole 134 of an attachment part 130, such as an attachment frame, fixed to the barrel body (fixed tube) of the lens barrel 2 and the case 18 of the drive unit 14, or any one of them, so that the screw-on portion 156 is fixed to the attachment part 130.

In the inner tube support means 38 configured as above, the inner tube body 60 is supported in the barrel body of the lens barrel 2 or the case 18 of the drive unit 14 in a movable manner in the fore-and-aft direction in a state in which rotation of the inner tube body 60 is restricted.

In FIG. 2, the inner tube drive means 40 serves as a mechanism in which the inner tube body 60 is moved in a fore-and-aft direction thereof. The inner tube drive means 40 includes the motor 160, a connection member 162, and a feed screw 164, as shown in FIG. 5, for example.

The motor 160 includes the body part 160A fitted and supported in the opening 154A in the rear side erected portion 154 of the fixing member 150 as described above, for example, and is fixed at a predetermined position with respect to the barrel body (fixed tube) of the lens barrel 2 or the case 18 of the drive unit 14. In addition, the motor 160 is configured to be operated by control of the control unit 100 of FIG. 2.

The connection member 162 is fixed to a base end of the feed screw 164 as well as to a rotary shaft 160B of the motor 160, whereby the feed screw 164 is connected to the rotary shaft 160B of the motor 160 as well as is rotated around its axis as the rotary shaft 160B is rotated.

The feed screw 164 is a rod-like member provided its outer peripheral surface with a thread. Meanwhile, the inner tube body 60 is provided its inner peripheral surface with a thread 64 so that the feed screw 164 is rotated to be screwed into the thread 64 of inner tube body 60, whereby the feed screw 64 is inserted into a hollow part 65 of the inner tube body 60 so as to be movable back and forth. In addition, the inner tube body 60 is supported by the inner tube support means 38 in a state in which rotation of the inner tube body 60 is restricted, therefore, the inner tube body 60 is configured to be moved back and forth in the fore-and-aft direction as the feed screw 64 is rotated.

Figure 4:
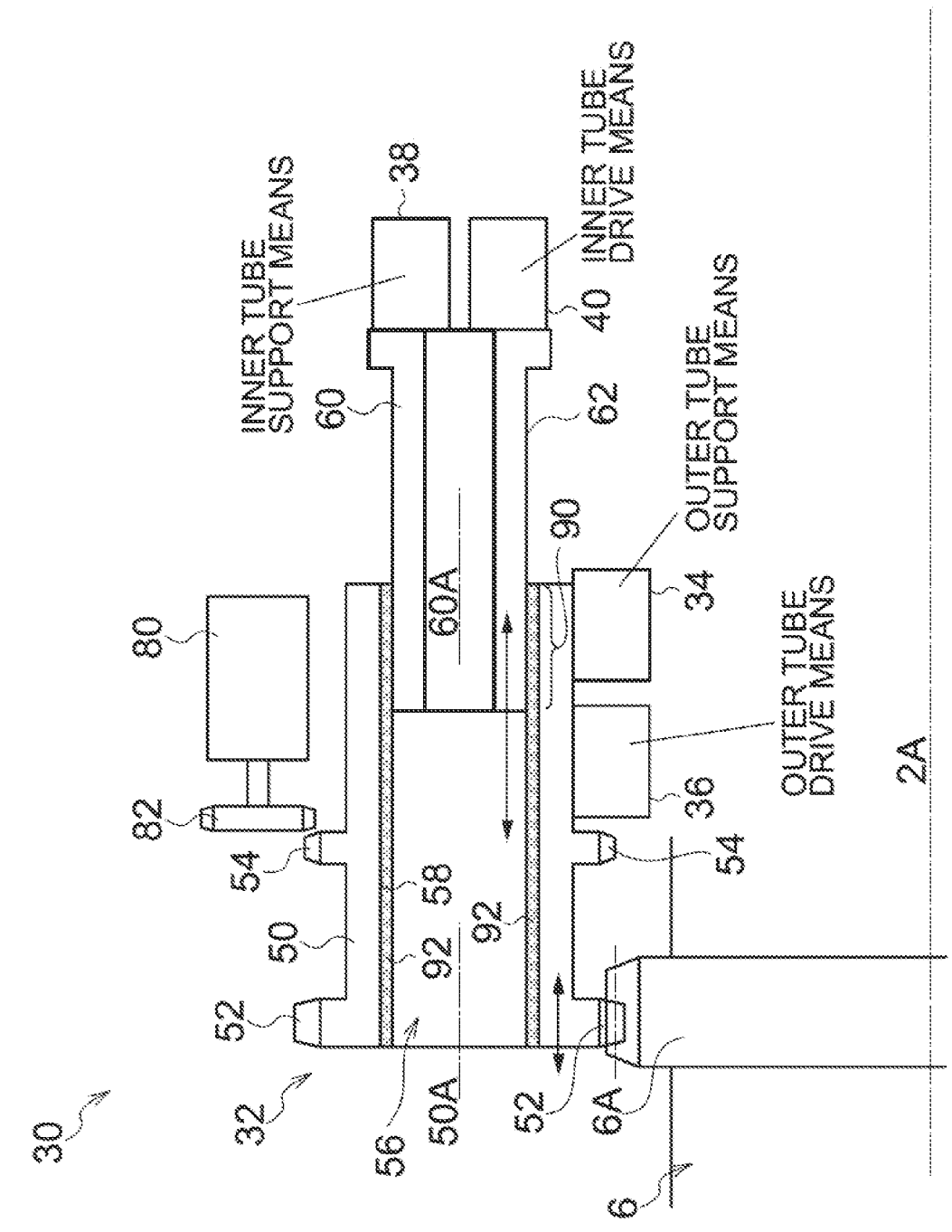
FIG. 4 shows a state in which operating force is changed with respect to the state of the device for changing operating force of FIG. 2.

In the inner tube drive means 40 configured as above, as the feed screw 164 is rotated by the motor 160, the inner tube body 60 is moved in the fore-and-aft direction, therefore, when the inner tube body 60 is moved in the fore-and-aft direction, area (an inserted amount of the inner tube body 60 with respect to the outer tube body 50) of the sliding contact region 90, in which the inner peripheral surface 58 of the outer tube body 50 and the outer peripheral surface 62 of the inner tube body 60 face each other, varies as shown in FIGS. 2 and 4 by being compared.

In FIG. 2, the inner tube body 60 is to be moved in the fore-and-aft direction by controlling a motor (the motor 160 in the structure of FIG. 5) of the inner tube drive means 40 with the control unit 100. The control unit 100, for example, detects a rotation position (operation position) of an operating force adjustment knob 110 provided in the drive unit 14 to be rotated for operation with a potentiometer to move the inner tube body 60 so that a position of the inner tube body 60 in the fore-and-aft direction corresponds to the rotation position of the operating force adjustment knob 110.

As a result, a load against rotation of the outer tube body 50 varies in accordance with a size of the area of the sliding contact region 90. As the sliding contact region 90 increases, the load also increases to increase operating force (operating torque) when a rotating operation of the zoom ring 6 is manually performed. Thus, a value of operating force required against rotation of the zoom ring 6 can be adjusted by moving the inner tube body 60 in the fore-and-aft direction to adjust the area of the sliding contact region 90, whereby it becomes possible to adjust the value of operating force so that an optimum operational feeling is obtained for each operator. In addition, it is easily possible to increase dimensions of the outer tube body 50 and the inner tube body 60 in the fore-and-aft direction and a movement amount of the inner tube body 60 in the fore-and-aft direction, thereby enabling a variation of the sliding contact region 90 to be increased to enable a variable amount of the operating force to be sufficiently increased as well.

Operation means for instructing a position of the inner tube body 60 is not limited to a form such as the operating force adjustment knob 110, so that operation means (hereinafter referred to as operating force operation means) of another form such as a slider may be applied. In addition, a settable position (an inserting amount of the inner tube body 60 with respect to the outer tube body 50) of the inner tube body 60 may serve as a continuous position or a plurality of separated positions (including two positions). In the operating force operation means, there may be provided a scale with numbers (percent indication in which maximum operating force is defined as 100 percent, for example) or characters (large, middle, and small, for example) indicating a value of operating force set at each position of a movable member, to which an operator moves the movable member as an indicated position. Further, lock means may be provided to disable an operation of the operating force operation means to prevent the inner tube body 60 from being moved due to a wrong operation of the operating force operation means. For example, there may be provided lock means for locking a movable member, which an operator moves for an indicated position in the operating force operation means, at a desired position, or instruction means (a switch or the like) that does not lock the movable member but allows the control unit 100 to disable the inner tube body 60 from being moved. In addition, the movable member may be concealed so as not to be operated.

Further, a desired position (a position where operating force against rotation of the zoom ring 6 becomes desired operating force) for setting the inner tube body 60 may be stored in advance. For example, providing a storage switch and a reproduction switch in the drive unit 14 allows the control unit 100 to read the switching state. When the storage switch is turned on after an operator sets the inner tube body 60 at a desired position with the operating force operation means, the control unit 100 reads a position at the time from a potentiometer included in the inner tube drive means 40 to store it in a memory as a preset position. In addition, a position instructed by the operating force operation means may be stored as information indicating a preset position. Meanwhile, when an operator turns on the reproduction switch, the control unit 100 reads out the preset position form the memory to move the inner tube body 60 to the preset position and set the preset position.

The inner tube body 60 may be set at a position automatically stored in advance by being associated with a type (model) or an individual of a camera body, to which the ENG lens 1 is attached, in accordance with the type of the camera body. For example, the drive unit 14 and the camera body are connected with a cable to transmit various pieces of information, so that the control unit 100 obtains identification information showing a type (model) or individual of the camera body from the camera body. Then, an operator stores a position where the inner tube body 60 is set by being associated with the identification information in a memory as the preset position. When the operator changes the position of the inner tube body 60 with the operating force operation means, the preset position stored by being associated with the identification information is updated to the new changed position, that is, a final position of the inner tube body 60 when the drive unit 14 and the camera body are connected is stored in the memory as the preset position by being associated with the identification information of the camera body. Further, it may be configured to allow a user to determine timing of storing the preset position by using the storage switch provided in the drive unit 14.

As described above, whenever a type or an individual of a camera body connected to the drive unit 14 is changed, identification information is obtained from the camera body. If the identification information is obtained for the first time, the identification information together with a preset position associated with the identification information are newly stored in the memory. If the obtained identification information corresponds with the identification information obtained before, the preset position stored by being associated with the identification information is read out from the memory to move the inner tube body 60 to the preset position and set the preset position. Further, it may be configured to allow a user to determine timing of setting the inner tube body 60 at the preset position by using the reproduction switch provided in the drive unit 14.

Accordingly, when a camera body (individual) is substantially determined for each cameraman, and the ENG lens 1 is mounted to a camera body that each cameraman uses for oneself, it is possible to set operating force and an operational feeling of an operating ring, such as the zoom ring 6 suitable for each cameraman with little effort.

In addition, it is possible that the inner tube drive means 40 does not serve as a mechanism of moving the inner tube body 60 in the fore-and-aft direction by using power of a motor, but serves as a mechanism of moving the outer tube body 50 in the fore-and-aft direction by operating force of an operator for the operating force operation means as described above.

As above, in the embodiment described above, a state in which the inner tube body 60 is completely removed from the hollow part 56 of the outer tube body 50 (area of the sliding contact region 90 is 0) may be allowed for an aspect of most reducing operating force of manually rotating the zoom ring 6, or it may be configured to move the outer tube body 50 more forward than the outer tube body 50 in the manual state of FIG. 2 to break connection between the gear part 6A of the zoom ring 6 and the gear part 52 of the outer tube body 50.

In addition, in the embodiment described above, the viscous fluid (grease 92) interposed between the outer tube body 50 and the inner tube body 60 is not limited to a specific material if a material has viscosity.

Further, in the embodiment described above, although the inner tube body 60 (non-rotating body) whose rotation is restricted is inserted and arranged inside (hollow part 56) the outer tube body 50 (rotating body) rotating by connecting to the zoom ring 6, it may be configured to arrange a non-rotating body whose rotation is restricted outside a rotating body rotating by connecting to the zoom ring 6 so that grease is interposed in a gap between an outer peripheral surface of the rotating body and an inner peripheral surface of the non-rotating body to apply a load caused by viscosity resistance of the grease against rotation of the rotating body. One of the rotating body and the non-rotating body, being positioned inside, may not be formed into a cylindrical shape having a hollow part, but has an outer peripheral surface like a circular cylinder surface.

In the embodiment described above, although the device for changing operating force in accordance with the present invention is described in a case where the device is provided for the zoom ring 6, the device for changing operating force may be provided for any operating ring, such as the focus ring 4 and the iris ring 8, with a configuration similar to the embodiment described above.

In addition, in the embodiment described above, there is described an embodiment of assembling the device for changing operating force, in accordance with the present invention, in a power transmission mechanism of transmitting power supplied from a motor to rotate an operating ring, as rotating force of the operating ring, for rotating the operating ring in accordance with an operation of electric operation means. The present invention, however, can be applied to a device for changing operating force required to rotate an operating ring, the device being provided in an operating ring by being independent of such a power transmission mechanism, that is, in the embodiment of FIG. 2, a device for changing operating force without the gear part 54 of the outer tube body 50 to be engaged with a gear of the motor for zoom drive 80, and the outer tube drive means 36 for moving the outer tube body 50 in the fore-and-aft direction, may be provided in a side of a lens barrel to only change operating force of an operating ring.

What is claimed is:

1. A device for changing operating force of a lens device, comprising:
    an operating ring rotatably provided around an outer periphery of a lens barrel;
    a rotating body connected to the operating ring to rotate around a rotary shaft in a predetermined direction together with rotation of the operating ring, the rotating body having a cylindrical peripheral surface centering on the rotary shaft;
    a non-rotating body whose rotation is restricted, the non-rotating body having a cylindrical peripheral surface being arranged by having a gap at a position facing the peripheral surface of the rotating body in a noncontact manner;

viscous fluid having viscosity interposed in the gap, the viscous fluid applying a load caused by viscosity resistance thereof against rotation of the rotating body rotating together with the operating ring to produce operating force required to rotate the operating ring by the load;

an operation member for changing operating force to be operated by an operator to change the operating force; and a non-rotating body driving device for changing a value of a load against rotation of the rotating body by moving the non-rotating body in a direction of the rotary shaft corresponding to an operation of the operation member for changing operating force by an operator to change a size of an area of a sliding contact region in which the peripheral surface of the rotating body and the peripheral surface of the non-rotating body face each other.

2. The device for changing operating force of a lens device according to claim 1, wherein the rotating body is formed into a cylindrical shape having a hollow part to have an inner peripheral surface serving as a peripheral surface of the rotating body, and the non-rotating body is inserted and arranged in the hollow part of the rotating body.

3. The device for changing operating force of a lens device according to claim 1, comprising a lock device for disabling an operation of the operation member for changing operating force.

4. The device for changing operating force of a lens device according to claim 2, comprising a lock device for disabling an operation of the operation member for changing operating force.

5. The device for changing operating force of a lens device according to claim 1, wherein the rotating body also serves as a component for connecting a motor for electrically rotating the operating ring and the operating ring in a power transmission mechanism.

6. The device for changing operating force of a lens device according to claim 2, wherein the rotating body also serves as a component for connecting a motor for electrically rotating the operating ring and the operating ring in a power transmission mechanism.

7. The device for changing operating force of a lens device according to claim 3, wherein the rotating body also serves as a component for connecting a motor for electrically rotating the operating ring and the operating ring in a power transmission mechanism.

8. The device for changing operating force of a lens device according to claim 4, wherein the rotating body also serves as a component for connecting a motor for electrically rotating the operating ring and the operating ring in a power transmission mechanism.

9. The device for changing operating force of a lens device according to claim 1, comprising an automatic changing device for automatically changing a position of the non-rotating body with respect to a direction of the rotary shaft by using the non-rotating body drive device in accordance with a type or an individual of a camera body to which the lens barrel is attached, thereby changing a value of the operating force.

10. The device for changing operating force of a lens device according to claim 2, comprising an automatic changing device for automatically changing a position of the non-rotating body with respect to a direction of the rotary shaft by using the non-rotating body drive device in accordance with a type or an individual of a camera body to which the lens barrel is attached, thereby changing a value of the operating force.

11. The device for changing operating force of a lens device according to claim 3, comprising an automatic changing device for automatically changing a position of the non-rotating body with respect to a direction of the rotary shaft by using the non-rotating body drive device in accordance with a type or an individual of a camera body to which the lens barrel is attached, thereby changing a value of the operating force.

12. The device for changing operating force of a lens device according to claim 4, comprising an automatic changing device for automatically changing a position of the non-rotating body with respect to a direction of the rotary shaft by using the non-rotating body drive device in accordance with a type or an individual of a camera body to which the lens barrel is attached, thereby changing a value of the operating force.

13. The device for changing operating force of a lens device according to claim 5, comprising an automatic changing device for automatically changing a position of the non-rotating body with respect to a direction of the rotary shaft by using the non-rotating body drive device in accordance with a type or an individual of a camera body to which the lens barrel is attached, thereby changing a value of the operating force.

14. The device for changing operating force of a lens device according to claim 6, comprising an automatic changing device for automatically changing a position of the non-rotating body with respect to a direction of the rotary shaft by using the non-rotating body drive device in accordance with a type or an individual of a camera body to which the lens barrel is attached, thereby changing a value of the operating force.

15. The device for changing operating force of a lens device according to claim 7, comprising an automatic changing device for automatically changing a position of the non-rotating body with respect to a direction of the rotary shaft by using the non-rotating body drive device in accordance with a type or an individual of a camera body to which the lens barrel is attached, thereby changing a value of the operating force.

16. The device for changing operating force of a lens device according to claim 8, comprising an automatic changing device for automatically changing a position of the non-rotating body with respect to a direction of the rotary shaft by using the non-rotating body drive device in accordance with a type or an individual of a camera body to which the lens barrel is attached, thereby changing a value of the operating force.

* * * * *